Patented Sept. 9, 1930

1,775,598

UNITED STATES PATENT OFFICE

JOHANNES HENDRIK VAN DER MEULEN, OF ARNHEM, NETHERLANDS

PROCESS OF PREPARING METAL BROMIDES

No Drawing. Application filed December 29, 1927, Serial No. 243,478, and in Germany February 25, 1927.

My invention relates to a process of preparing bromides from bromine. It is known in the art that by the direct action of oxides, hydroxides and carbonates on bromine in the presence of water, as well as the bromides, hypobromites and bromates are also formed. The separation of the bromides on the one side and bromates or hypobromites on the other side is a very tedious operation, and in practice other processes have been used up to now, such as the reaction between potassium carbonate and ironbromide.

Now I have found that a very good yield may be obtained which may rise to about 100% if a process is used which according to my invention consists of preparing metal bromides by the reaction between nonacid compounds of the corresponding metals and bromine in the presence of water and using a reducing agent which, during the process, is converted into water or gases or both. I may also use reducing agents which during the reaction are converted into gases or water and which contain a metal from which the bromide is to be prepared. Further features of my invention will be described below and claimed in the annexed claims.

The term "nonacid compounds" in the present specification and in the claims is intended to cover oxides, hydroxides, carbonates and bicarbonates of the metals sodium, potassium, calcium and other metals from which the bromides are to be prepared.

Reducing agents which are converted into water and/or gases may be nitrogen-containing organic or inorganic compounds such as urea, cyanamide, ammonia, ammonium carbonate, ammoniumbicarbonate, formamide, carbamates, ammonium cyanide; or easily decomposable organic acids such as formic acid, oxalic acid; or ammonium or metal compounds of these compounds e. g. calcium nitride, formates, oxalates and so on.

Further mixtures of substances which give similar reducing agents on mixing may be used e. g. hexamethylenetetramine.

If metal compounds such as nitrides, formates, oxalates are used these substances must be chosen in accordance with the metal from which the bromide is to be prepared.

The process according to my invention has the considerable advantage that no bromates or other compounds containing both bromine and oxygen are formed. I obtain a solution containing no substances such as metal salts which can only be removed by a long and laborious process such as is the case in using the known processes of preparing metal bromides.

Due to the fact that the reducing agents which I employ yield only water or gases and do not form salts other than the bromides to be prepared, it is possible to evaporate the reaction mixture thus leaving the bromide in a pure state.

As I have already stated, I may also use reducing agents which contain the metal from which the bromide is to be prepared. Under certain conditions it is even possible to reduce the proportion of the oxides, hydroxides or carbonates or even to do away with the oxides, hydroxides and carbonates although as a rule it is of advantage to use the compounds referred to.

I may employ the usual oxides, hydroxides and carbonates such as burnt lime, hydrate of lime, marble, sodium carbonate, sodiumhydroxide, sodiumdicarbonate, potassiumcarbonate and so on.

My process may be explained by the following special examples which, however, may be modified in different ways:

1. In a suitable vessel containing 500 c. c. of water in which 60 grams of urea are dissolved, 480 grams of liquid bromine are introduced. Part of the bromine is dissolved into the solution of urea in water, but the main part sinks to the bottom as a dark red brownish mass. The reaction vessel is provided with a cooler with re-flux and a gas pipe, e. g. one containing a long glass spiral. On the vessel a separating funnel is arranged in which a solution of 318 grams of sodium carbonate in water is present. This solution is preferably as concentrated as possible and may be warmed if desired in order to prevent crystallization. Also, the separating funnel may be connected with the top part of the cooler.

In opening the cock of the separating funnel the solution of sodium carbonate drips into the reaction mixture, and every drip causes a violent reaction under evolution of carbonic acid. Some bromine vapors are carried along mechanically and are condensed in the cooler, in so far as they are not brought back by the sodium carbonate solution flowing downward.

If desired, the reaction vessel may be cooled. In order to prevent non-condensed bromine vapours from escaping, an apparatus containing suitable absorption means may be used.

After the reaction is completed which is perceptible by the almost complete decolorization of the reaction mixture, the vessel is opened and the solution is evaporated in a suitable way. The bromide of sodium crystallizes from the concentrated solution, without any purification being necessary; there is no special need to reduce any bromine-oxygen-compound.

2. 480 grams of bromine are covered by 500 c. c. of water in the apparatus as described in Example 1. In the funnel a solution of 204 grams of sodium formate and 159 grams of sodium carbonate in 1250 grams of water is present. The reaction proceeds as in Example 1.

3. 390 grams of calcium formate, calculated on the dry compound and 300 grams of calcium carbonate, preferably in the form of chalk or pieces of marble together with 2 litres of water are brought into a vessel as described in Example 1. From the funnel 960 grams of bromine are poured very slowly into the reaction mixture. The pipe of the funnel opens at a small distance from the bottom of the reaction vessel. In this way I obtain very easily a concentrated solution of calcium bromide which is separated in the way as indicated in Example 1.

Instead of water one may also use the mother lye of previous reactions to dissolve the reaction means or to cover the bromine.

It is to be understood that several modifications in my process are possible without departing from the scope of my invention. So, for instance, instead of evaporating the liquid I may add a sufficient proportion of carbonate of potassium or of sodium causing the main part of the bromides to precipitate. Then the reducing agent is added and thereupon a fresh quantity of bromine is poured into the reaction vessel, and my process is thus rendered continuous, or nearly continuous.

I claim:

1. A process of preparing alkali or alkaline earth metal bromides which consists in causing a reaction between bromine and non-acid compounds of the corresponding metals and a reducing agent having the property of conversion into water or gases or both during the process and with no precipitate, and then separating the water or gases or both and the bromide.

2. A process of preparing alkali or alkaline earth metal bromides which consists in causing a reaction between bromine and non-acid compounds of the corresponding metals and forming a solution that includes a reducing agent free from a precipitate, the metallic residue corresponding with the metal of which the bromide is produced.

In testimony whereof I affix my signature.

JOHANNES HENDRIX van der MEULEN.